United States Patent
Kedem

(10) Patent No.: US 10,649,799 B2
(45) Date of Patent: May 12, 2020

(54) HYPERVISOR VIRTUAL SERVER SYSTEM, AND METHOD FOR PROVIDING DATA SERVICES WITHIN A HYPERVISOR VIRTUAL SERVER SYSTEM

(75) Inventor: Ziv Kedem, Tel Aviv (IL)

(73) Assignee: Zerto Ltd., Herzilya (IL)

( * ) Notice: Subject to any disclaimer, the term of this patent is extended or adjusted under 35 U.S.C. 154(b) by 381 days.

(21) Appl. No.: 13/039,446

(22) Filed: Mar. 3, 2011

(65) Prior Publication Data

US 2011/0231841 A1    Sep. 22, 2011

Related U.S. Application Data

(60) Provisional application No. 61/314,589, filed on Mar. 17, 2010.

(51) Int. Cl.

| | | |
|---|---|---|
| G06F 9/455 | (2018.01) | |
| G06F 3/06 | (2006.01) | |
| G06F 9/54 | (2006.01) | |
| G06F 11/14 | (2006.01) | |

(52) U.S. Cl.
CPC ......... *G06F 9/45558* (2013.01); *G06F 3/067* (2013.01); *G06F 3/0619* (2013.01); *G06F 3/0653* (2013.01); *G06F 3/0665* (2013.01); *G06F 3/0689* (2013.01); *G06F 9/45533* (2013.01); *G06F 9/545* (2013.01); *G06F 11/1471* (2013.01); *G06F 2009/4557* (2013.01); *G06F 2009/45579* (2013.01); *G06F 2009/45595* (2013.01); *G06F 2209/542* (2013.01)

(58) Field of Classification Search
CPC ... G06F 9/45533; G06F 9/45558; H04L 67/08
USPC .......................................................... 710/20
See application file for complete search history.

(56) References Cited

U.S. PATENT DOCUMENTS

| | | |
|---|---|---|
| 5,212,784 A | 5/1993 | Sparks |
| 5,544,347 A | 8/1996 | Yanai et al. |
| 5,649,152 A | 7/1997 | Ohran et al. |
| | (Continued) | |

FOREIGN PATENT DOCUMENTS

WO    2009151445 A1    12/2009

OTHER PUBLICATIONS

Olzak, T., "Secure hypervisor-based vitual server environments", Feb. 26, 2007. http://www.techrepublic.com/blog/security/secure-hypervisor-based-virtual-server-environments/160.

(Continued)

*Primary Examiner* — Farley Abad
(74) *Attorney, Agent, or Firm* — Foly & Lardner LLP; James De Vellis

(57) ABSTRACT

A hypervisor virtual server system, including a plurality of virtual servers, a plurality of virtual disks that are read from and written to by the plurality of virtual servers, a physical disk, an I/O backend coupled with the physical disk and in communication with the plurality of virtual disks, which reads from and writes to the physical disk, a tapping driver in communication with the plurality of virtual servers, which intercepts I/O requests made by any one of said plurality of virtual servers to any one of said plurality of virtual disks, and a virtual data services appliance, in communication with the tapping driver, which receives the intercepted I/O write requests from the tapping driver, and that provides data services based thereon.

17 Claims, 2 Drawing Sheets

(56) References Cited

U.S. PATENT DOCUMENTS

| | | | |
|---|---|---|---|
| 5,664,186 | A | 9/1997 | Bennett et al. |
| 5,835,953 | A | 11/1998 | Ohran |
| 5,933,653 | A | 8/1999 | Ofek |
| 5,935,260 | A | 8/1999 | Ofer |
| 5,991,813 | A | 11/1999 | Zarrow |
| 6,073,209 | A | 6/2000 | Bergsten |
| 6,073,222 | A | 6/2000 | Ohran |
| 6,658,591 | B1 | 12/2003 | Arndt |
| 6,910,160 | B2 | 6/2005 | Bajoria et al. |
| 6,944,847 | B2 | 9/2005 | Desai et al. |
| 7,143,307 | B1 | 11/2006 | Witte et al. |
| 7,325,159 | B2 | 1/2008 | Stager et al. |
| 7,421,617 | B2 | 9/2008 | Anderson et al. |
| 7,464,126 | B2 | 12/2008 | Chen |
| 7,475,207 | B2 | 1/2009 | Bromling et al. |
| 7,516,287 | B2 | 4/2009 | Ahal et al. |
| 7,523,277 | B1 | 4/2009 | Kekre et al. |
| 7,557,867 | B2 | 7/2009 | Goo |
| 7,577,817 | B2 | 8/2009 | Karpoff et al. |
| 7,577,867 | B2 | 8/2009 | Lewin et al. |
| 7,603,395 | B1 | 10/2009 | Bingham et al. |
| 7,647,460 | B1 | 1/2010 | Wilson et al. |
| 7,720,817 | B2 | 5/2010 | Stager et al. |
| 7,765,433 | B1* | 7/2010 | Krishnamurthy ............... 714/42 |
| 7,791,091 | B2 | 9/2010 | Nagai |
| 7,849,361 | B2 | 12/2010 | Ahal et al. |
| 7,865,893 | B1 | 1/2011 | Omelyanchuk et al. |
| 7,971,091 | B1 | 6/2011 | Bingham et al. |
| 8,156,301 | B1* | 4/2012 | Khandelwal et al. ........ 711/170 |
| 8,296,419 | B1 | 10/2012 | Khanna et al. |
| 8,352,941 | B1 | 1/2013 | Protopopov et al. |
| 8,650,299 | B1 | 2/2014 | Huang et al. |
| 2004/0068561 | A1 | 4/2004 | Yamamoto et al. |
| 2004/0153639 | A1* | 8/2004 | Cherian et al. ................... 713/2 |
| 2005/0071588 | A1 | 3/2005 | Spear et al. |
| 2005/0171979 | A1 | 8/2005 | Stager et al. |
| 2005/0182953 | A1 | 8/2005 | Stager et al. |
| 2005/0188256 | A1 | 8/2005 | Stager et al. |
| 2006/0047996 | A1 | 3/2006 | Anderson et al. |
| 2006/0112222 | A1* | 5/2006 | Barrall .......................... 711/114 |
| 2006/0129562 | A1 | 6/2006 | Pulamarasetti et al. |
| 2006/0161394 | A1 | 7/2006 | Dulberg et al. |
| 2007/0028244 | A1 | 2/2007 | Landis et al. |
| 2007/0162513 | A1* | 7/2007 | Lewin et al. ................. 707/200 |
| 2007/0220311 | A1* | 9/2007 | Lewin et al. ..................... 714/6 |
| 2008/0086726 | A1 | 4/2008 | Griffith et al. |
| 2008/0177963 | A1 | 7/2008 | Rogers |
| 2008/0195624 | A1 | 8/2008 | Ponnappan et al. |
| 2009/0187776 | A1 | 7/2009 | Baba et al. |
| 2009/0249330 | A1 | 10/2009 | Abercrombie et al. |
| 2009/0283851 | A1 | 11/2009 | Chen |
| 2010/0017801 | A1 | 1/2010 | Kundapur |
| 2010/0027552 | A1 | 2/2010 | Hill |
| 2010/0150341 | A1* | 6/2010 | Dodgson et al. ............... 380/29 |
| 2010/0175064 | A1* | 7/2010 | Brahmaroutu ..................... 718/1 |
| 2010/0198972 | A1 | 8/2010 | Umbehocker |
| 2010/0250824 | A1* | 9/2010 | Belay ............................... 711/6 |
| 2010/0250892 | A1* | 9/2010 | Logan et al. ................. 711/173 |
| 2010/0274886 | A1 | 10/2010 | Nahum et al. |
| 2010/0274890 | A1 | 10/2010 | Patel |
| 2011/0022812 | A1 | 1/2011 | van der Linden et al. |
| 2011/0075674 | A1 | 3/2011 | Li et al. |
| 2011/0099200 | A1 | 4/2011 | Blount et al. |
| 2011/0099342 | A1 | 4/2011 | Ozdemir |
| 2011/0125980 | A1 | 5/2011 | Brunet et al. |
| 2011/0131183 | A1 | 6/2011 | Chandhok et al. |
| 2011/0153569 | A1 | 6/2011 | Fachan et al. |
| 2011/0161299 | A1 | 6/2011 | Prahlad et al. |
| 2011/0161301 | A1 | 6/2011 | Pratt et al. |
| 2011/0264786 | A1 | 10/2011 | Kedem et al. |
| 2012/0110086 | A1 | 5/2012 | Baitinger et al. |
| 2012/0185913 | A1 | 7/2012 | Martinez et al. |
| 2013/0014104 | A1 | 1/2013 | Natanzon et al. |

OTHER PUBLICATIONS

U.S. Office Action dated Apr. 26, 2013 in related U.S. Appl. No. 13/367,448, filed Feb. 7, 2012,19 pages.

U.S. Office Action dated Jun. 21, 2013 in related U.S. Appl. No. 13/175,892, filed Jul. 4, 2011, 15 pages.

Illuminata EMC RecoverPoint: Beyond Basics CDP Searched via internet on Nov. 10, 2013.

Mendocino: The RecoveryOne Solution, Architecture Guide, 22 pages Product Version 1.0, Jan. 3, 2006.

NetWorker PowerSnap Module for EMC Symmetrix, Realease 2.1 Installation and Administrator's Guide, 238 pgs, printed Sep. 2005.

Notification Concerning Transmittal of International Preliminary Report on Patentability dated Jan. 7, 2014 in corresponding PCT Application No. PCT/IL2012/000271, 12 pages.

U.S. Final Office Action dated Feb. 13, 2014 in related U.S. Appl. No. 13/367,448, filed Feb. 7, 2012.

Notice of Allowance for U.S. Appl. No. 13/175,892 dated Apr. 3, 2015.

U.S. Office Action for U.S. Appl. No. 13/175,898 dated Mar. 25, 2015.

Amendment "B" and Response to Office Action from Prosecution History of U.S. Pat. No. 7,603,395, dated Apr. 9, 2009, (13 pages).

Amendment "E" and Response to Office Action from Prosecution History of U.S. Pat. No. 7,971,091., dated Nov. 19, 2010, (14 pages).

Amendment and Response to Office Action from Prosecution History of U.S. Pat. No. 7,647,460, dated Aug. 30, 1999(22 pages).

Answer Claim Construction Brief of Plaintiffs EMC Corporation and EMC Israel Development Center, LTD., EMC Corporation and EMC Israel Development Center, LTD., v. Zerto, Inc., Case No. 12-956(GMS), May 9, 2014, (24 pages).

Appellants' Brief Pursuant to 37 C.F.R section 1.192 from Prosecution History of U.S. Pat. No. 7,647,460., May 9, 2002, (34 pages).

Complaint, EMC Corporation and EMC Israel Development Center, LTD., v. Zerto, Inc., Case No. __ Demand for Jury Trial, Jul. 20, 2012, (13 pages).

Defendant Zerto, Inc.'s Amended Answer to the First Amended Complaint, Affirmative Defense, and Counterclaims, EMC Corporation and EMC Israel Development Center, LTD., v. Zerto, Inc., Case No. 12-956-GMS, Aug. 7, 2014, (34 pages).

Defendant Zerto, Inc.'s Claim Construction Answering Brief, EMC Corporation and EMC Israel Development Center, LTD., v. Zerto, Inc., Case No. 12-956 (GMS), May 9, 2014, (23 pages).

Defendant Zerto, Inc.'s Opening Brief in Support of its Motion for Leave to Amend its Answer to the First Amended Complaint, Affirmative Defense and Counterclaims, EMC Corporation and EMC Israel Development Center, LTD., v. Zerto, Inc., Case No. 12-956-GMS, Jun. 6, 2014, (24 pages).

Defendant Zerto, Inc.'s Opening Brief in Support of Its Motion for Leave to Amend Its Answer to the First Amended Complaint, Affirmative Defense and Counterclaims, EMC Corporation and EMC Israel Development Center, LTD., vs. Zerto, Inc., Case No. 12-956(GMS) 24 pages, Jun. 6, 2014.

Defendant Zerto, Inc.'s Opening Claim Construction Brief., EMC Corporation and EMC Israel Development Center, LTD., v. Zerto, Inc., Case No. 12-956(GMS), Apr. 11, 2014, (26 pages).

Defendant Zerto, Inc.'s Reply Brief in Support of its Motion for Leave to Amend its Answer to the First Amended Compliant, Affirmative Defense and Counterclaims, EMC Corporation and EMC Israel Development Center, LTD., v. Zerto, Inc., Case No. 12-956-GMS, Jul. 9, 2014, (16 pages).

Defendant's Answering Brief in Opposition to Plaintiffs' Motion to Strike and Dismiss Defendant's Affirmative Defense and Counterclaims of "Invalidity" based on Assignor Estoppel, EMC Corporation and EMC Israel Development Center, LTD., v. Zerto, Inc., Case No. 12-956(GMS), Nov. 5, 2012, (21 pages).

EMC Corporation and EMC Israel Development Center, LTD.'s Answer to the Amended Counterclaims of Zerto Inc., EMC Corporation and EMC Israel Development Center, LTD., v. Zerto, Inc., Case No. 12-956-GMS, Aug. 25, 2014, (12 pages).

(56) References Cited

OTHER PUBLICATIONS

EMC's Answer Brief in Opposition to Zerto's Motion for Judgment on the Pleadings on Count III o fthe First Amended Complaint, EMC Corporation and EMC Israel Development Center, *LTD.*, v. *Zerto, Inc.*, Case No. 12-956-GMS, Aug. 11, 2014, (25 pages).
EMC's Answering Brief in Opposition to Zerto's Motion for Leave to Amend its Answer to the First Amended Complaint by Adding an Inequitable Conduct Defense and Counterclaims, EMC Corporation and EMC Israel Development Center, *LTD.*, v. *Zerto, Inc.*, Case No. 12-956-GMS, Jun. 23, 2014 (25 pages).
Joint Appendix of Intrinsic and Dictionary Evidence, EMC Corporation and EMC Israel Development Center, *LTD.*, v. *Zerto, Inc.*, Case No. 12-956-GMS, May 12, 2014, (366 pages).
Joint Claim Construction Chart, EMC Corporation and EMC Israel Development Center, *LTD.*, v. *Zerto, Inc.*, Case No. 12-956(GMS), Mar. 21, 2014, (24 pages).
Memorandum, EMC Corporation and EMC Israel Development Center, *LTD.*, v. *Zerto, Inc.*, Case No. 12-956-GMS, Jul. 31, 2014 (8 pages).
Opening Brief in Support of Defendant Zerto, Inc.'s Motion for Judgment on the Pleadings on Count III of the First Amended Compliant, EMC Corporation and EMC Israel Development Center, *LTD.*, v. *Zerto, Inc.*, Case No. 12-956-GMS, Jul. 25, 2014, (19 pages).
Order Construing the Terms of U.S. Pat. Nos. 7,647,460; 6,073,222; 7,603,395; 7,971,091; and 7,577,867, EMC Corporation and EMC Israel Development Center, *LTD.*, v. *Zerto, Inc.*, Case No. 12-956-GMS, Sep. 5, 2014, (0 pages).
Plaintiffs EMC Corporation and EMC Israel Development Center, LTD.'s Opening Claim Construction Brief, EMC Corporation and EMC Israel Development Center, *LTD.*,v. *Zerto, Inc.*, Case No. 12-956(GMS), Apr. 11, 2014, (26 pages).
Plaintiffs' Opening Brief in Support of their Motion to Strike and Dismiss Defendant's Affirmative Defense and Counterclaims of "Invalidity" Based on Assignor Estoppel, EMC Corporation and EMC Israel Development Center, *LTD.*, v. *Zerto, Inc.*, Case No. 12-956(GMS), Oct. 4, 2012, (18 pages).
Revised Joint Claim Construction Chart, EMC Corporation and EMC Israel Development Center, *LTD.*, v. *Zerto, Inc.*, Case No. 12-956(GMS), Apr. 11, 2014, (19 pages).
Revised Joint Claim Construction Chart, EMC Corporation and EMC Israel Development Center, *LTD.*, v. *Zerto, Inc.*, Case No. 12-956(GMS), Jun. 6, 2014, (19 pages).
Transcript of Markman Hearing, EMC Corporation and EMC Israel Development Center, *LTD.*, v. *Zerto, Inc.*, Case No. 12-956-GMS, Jun. 25, 2014 (94 pgs).
FreezeFrame User's Guide, Version 1.1, Document Version 1.1, 60 pgs, Nov. 1993.
Harper Collins, Collins English Dictionary, Third Edition Updated 1994, Section JA-258-260(3 pages).
Merriam-Webster, Inc., Webster's Third New International Dictionary, Section JA-276-279 (4 pages) Copyright 2002.
Microsoft Press, Microsoft Computer Dictionary, Fifth Edition, Section JA-341-343, p. 296 (4 pages) 2002.
Reference Model for Open Storage Systems Interconnection, Mass Storage System Reference Model Version 5, Sep. 1994 (36 pages).
Storage Networking Industry Association Dictionary, http://web.archive.org/web20060220153102/http://www.snia.org/education/dictionary/a, pp. JA-261-273 (13 pages) 2006.
Tech Target Search.,http://searchstorage.techtarget.com/definition/storage-snapshot.html, (p. JA-274) Jul. 2005.
The Kashya KB 4000 Administrator's User Guide Product Release 2.0, 105 pgs, Aug. 2004.
The RecoveryONE Solution, Architecture Guide, Product Version 1.0, 22 pgs, Jan. 2006.
Warrick, et al, "IBM Total Storage Enterprise Storage Server Implementing ESS Copy Services in Open Environments", 642 pgs, IBM Jul. 2004.
Webster's New World Dictionary, Dictionary of Computer Terms, Sixth Edition, (4 pages).
Notice of Allowance for U.S. Appl. No. 13/175,892 dated Dec. 23, 2014.
U.S. Office Action dated Apr. 18, 2014 in related U.S. Appl. No. 13/175,892, filed Jul. 4, 2011.
U.S. Office Action in related U.S. Appl. No. 13/367,448 dated Feb. 3, 2015.
Notice of Allowance on U.S. Appl. No. 13/367,448 dated Jul. 28, 2016.
Notice of Allowance on U.S. Appl. No. 14/687,341 dated Aug. 18, 2016.
Office Action on U.S. Appl. No. 13/175,898 dated Jul. 7, 2016.
U.S. Office Action on U.S. Appl. No. 14/687,341 dated Mar. 3, 2016.
"Zerto Hits Triple-Digit Growth Once Again, Builds Toward a Future of Uninterrupted Technology," Zerto, Feb. 3, 2015, 2 pages.
A Comparison of Hypervisor-based Replication vs. Current and Legacy BC/DR Technologies, 2012.
Choosing A VSS Provider Veeam Backup Guide for HyperV, Mar. 18, 2015.
Defendant Zerto, Inc's Motion for Judgment as a Matter of Law of No Willful Infringement of the '867 Patent . . . , Apr. 30, 2015.
Deploy Hyper-V Replica, published May 31, 2012.
Double-Take Availability for vSphere: Technical Data Sheet, 2014.
EMC Recoverpoint Family, 2012.
EMC Recoverpoint for Virtual Machines: Protects and Recovers VMs to Any Point in Time, 2012.
EMC's Answering Brief in Opposition of Zerto's Renewed Motion for Judgment as a Matter of Law or, in the Alternative, for a New Trial, Jul. 17, 2015.
EMC's Answering Brief in Opposition to Zerto's Motion for a New Trial and to Alter or Amend the Judgment, due to an Inconsistent Verdict, Jul. 17, 2015.
EMC's Opening Brief in Support of Its Motion for an Accounting and to Amend the Judgment, Jun. 24, 2015.
EMC's Opening Brief in Support of Its Renewed Motion for Judgment as a Matter of Law, Jun. 5, 2015.
Failed to Create a Quiesced Snapshot of a VM, Nov. 5, 2014, http://nakivo.com.
Features Nakivo Backup and Replication, accessed Jul. 7, 2015, http:www/nakivo.com/VMware-VM-backup-replication-features.htm.
HP 3PAR Remote Copy Software User Guide HP 3PAR OS 3.2.1 MU2, o 2009.
HP 3PAR Remote Copy Software, 2015, www.hp.com.
Hyper-V Replica Feature Overview, published Feb. 29, 2012.
Is Synchronous Replication Enough, May 29, 2013, http://www.zerto.com/blog/general/is-synchronous-replication-enough.
Judgment, May 21, 2015.
Letter regarding EMC's Request to File Summary Judgment Motions—Redacted, dated Feb. 13, 2015, 120 pages.
Letter to Judge Sleet re. *EMC Corporation v. Zerto, Inc.*, Feb. 6, 2015.
Letter to Judge Sleet Regarding EMC's Request for Summary Judgment, Oct. 21, 2014, 120 pages.
Managing VM Data with Tintri, Phillips, John, 2013.
Plaintiff's Motion for Judgment As a Matter of Law Pursuant to Fed. R. Civ. P. 50(a), May 6, 2015.
ReplicateVM, Replicate VMs, not LUNS, Jul. 7, 2015, http://www.tintri.com/producs/replicatevm.
Report on the Filing or Determination of an Action Regarding a Patent or Trademark, May 22, 2015.
Scalable, High-Performance, and Cost-Effective Remote Replication on Hitachi Unified Storage and Brocade Extension Platforms, 2012, www.brocade.com.
Unitrends Enterprise Backup Software and Solutions, 2015, http://www.unitrends.com/products/enterprise-backup-software/unitrends-enterprise-backup.
Unitrends Release 7.3 Beta Now Available, Nov. 26, 2013, http://blogs.unitrends.com/unitrends-release-7-3-beta-now-available/.
U.S. Office Action on U.S. Appl. No. 13/367,456 dated Oct. 1, 2015.
U.S. Office Action on U.S. Appl. No. 14/687,341 dated Sep. 11, 2015.

(56) References Cited

OTHER PUBLICATIONS

VMware vCenter Site Recovery Manager5 with vSphere Replication, 2011.
VMware vSphere Replication 6.0, Apr. 2015.
VReplicator Version 3.0, 2009.
Zerto Announces General Availability of Zerto Virtual Replication Version 4.0, May 5, 2015.
Zerto Inc.'s Motion for Judgment as a Matter of Law, May 6, 2015.
Zerto Raises 26 Million in Series D Financing to Accelerate Hybrid Cloud Adoption, Jun. 18, 2014.
Zerto Virtual Replication Release Notes, 2015.
Zerto, Inc's Brief in Support of Its Motion for a New Trial, and to Alter or Amend the Judgment, Due to an Inconsistent Verdict, Jun. 19, 2015.
Zerto, Inc's Brief in Support of Its Renewed Motion for Judgment As a Matter of Law or, in the Alternative, for a New Trial, Jun. 19, 2015.
Zerto's Hypervisor-based Replication: A New Approach to Business/Continuity Disaster Recovery, 2012.
Zerto's Hypervisor-Based, Enterprise-Class Replication and Continuous Data Protection, 2012.
Zerto's Protect Applications, Not Just Data: BC/DR for Virtualized Applications, 2012.
Zerto's ZVR and Hyper-V, 2014.
Office Action on U.S. Appl. No. 13/175,898 dated Dec. 18, 2015.
U.S. Final Office Action on U.S. Appl. No. 13/175,892 dated Apr. 8, 2016.
U.S. Notice of Allowance on U.S. Appl. No. 13/367,456 dated May 11, 2016.
Non-Final Office Action on U.S. Appl. No. 14/831,623 dated Sep. 20, 2019, 13 pages.
Notice of Allowance on U.S. Appl. No. 15/194,097 dated Sep. 11, 2019, 5 pages.
Notice of Allowance on U.S. Appl. No. 15/231,388 dated Sep. 16, 2019, 8 pages.
Notice of Allowance on U.S. Appl. No. 15/194,097 dated Dec. 30, 2019, 5 pages.
Notice of Allowance on U.S. Appl. No. 15/231,388 dated Jan. 23, 2020, 8 pages.

* cited by examiner

HYPERVISOR VIRTUAL SERVER SYSTEM, AND METHOD FOR PROVIDING DATA SERVICES WITHIN A HYPERVISOR VIRTUAL SERVER SYSTEM

CROSS REFERENCES TO RELATED APPLICATIONS

This application claims priority benefit of U.S. Provisional Application No. 61/314,589, entitled METHODS AND APPARATUS FOR PROVIDING HYPERVISOR LEVEL DATA SERVICES FOR SERVER VIRTUALIZATION, filed on Mar. 17, 2010 by inventor Ziv Kedem.

FIELD OF THE INVENTION

The present invention relates to virtual server environments and data services.

BACKGROUND OF THE INVENTION

Virtual servers are logical entities that run as software in a server virtualization infrastructure, referred to as a "hypervisor". Examples of hypervisors are VMWARE® ESX manufactured by VMware, Inc. of Palo Alto, Calif., HyperV manufactured by Microsoft Corporation of Redmond, Wash., XENSERVER® manufactured by Citrix Systems, Inc. of Fort Lauderdale, Fla., Redhat KVM manufactured by Redhat, Inc. of Raleigh, N.C., and Oracle VM manufactured by Oracle Corporation of Redwood Shores, Calif. A hypervisor provides storage device emulation, referred to as "virtual disks", to virtual servers. Hypervisor implements virtual disks using back-end technologies such as files on a dedicated file system, or raw mapping to physical devices.

As distinct from physical servers that run on hardware, virtual servers run their operating systems within an emulation layer that is provided by a hypervisor. Although virtual servers are software, nevertheless they perform the same tasks as physical servers, including running server applications such as database applications, customer relation management applications and MICROSOFT EXCHANGE SERVER®. Most applications that run on physical servers are portable to run on virtual servers. As distinct from virtual desktops that run client side applications and service individual users, virtual servers run applications that service a large number of clients.

As such, virtual servers depend critically on data services for their availability, security, mobility and compliance requirements, the data services including inter alia continuous data protection, disaster recovery, remote replication, data security, mobility, and data retention and archiving policies.

SUMMARY OF THE DESCRIPTION

Aspects of the present invention relate to a dedicated virtual data service appliance (VDSA) within a hypervisor that can provide a variety of data services. Data services provided by a VDSA include inter alia replication, monitoring and quality of service.

In an embodiment of the present invention, a tapping filter driver is installed within the hypervisor kernel. The tapping driver has visibility to I/O requests made by virtual servers running on the hypervisor.

A VDSA runs on each physical hypervisor. The VDSA is a dedicated virtual server that provides data services; however, the VDSA does not necessarily reside in the actual I/O data path. When a data service processes I/O asynchronously, the VDSA receives the data outside the data path.

Whenever a virtual server performs I/O to a virtual disk, the tapping driver identifies the I/O requests to the virtual disk. The tapping driver copies the I/O requests, forwards one copy to the hypervisor's backend, and forwards another copy to the VDSA.

Upon receiving an I/O request, the VDSA performs a set of actions to enable various data services. A first action is data analysis, to analyze the data content of the I/O request and to infer information regarding the virtual server's data state. E.g., the VDSA may infer the operating system level and the status of the virtual server. This information is subsequently used for reporting and policy purposes.

A second action, optionally performed by the VDSA, is to store each I/O write request in a dedicated virtual disk for journaling. Since all I/O write requests are journaled on this virtual disk, the virtual disk enables recovery data services for the virtual server, such as restoring the virtual server to an historical image.

A third action, optionally performed by the VDSA, is to send I/O write requests to different VDSAs, residing on hypervisors located at different locations, thus enabling disaster recovery data services.

There is thus provided in accordance with an embodiment of the present invention a hypervisor virtual server system, including a plurality of virtual servers, a plurality of virtual disks that are read from and written to by the plurality of virtual servers, a physical disk, an I/O backend coupled with the physical disk and in communication with the plurality of virtual disks, which reads from and writes to the physical disk, a tapping driver in communication with the plurality of virtual servers, which intercepts I/O requests made by any one of said plurality of virtual servers to any one of said plurality of virtual disks, and a virtual data services appliance, in communication with the tapping driver, which receives the intercepted I/O write requests from the tapping driver, and which provides data services based thereon.

There is additionally provided in accordance with an embodiment of the present invention a method for providing data services within a hypervisor virtual server system, including intercepting I/O requests from any one of a plurality of virtual servers to one of a plurality of virtual disks, and sending intercepted I/O write requests to a virtual data services appliance that provides hypervisor data services.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a dedicated virtual data services appliance (VDSA) within a hypervisor, which is used to provide a variety of hypervisor data services. Data services provided by a VDSA include inter alia replication, monitoring and quality of service.

Figure 1:
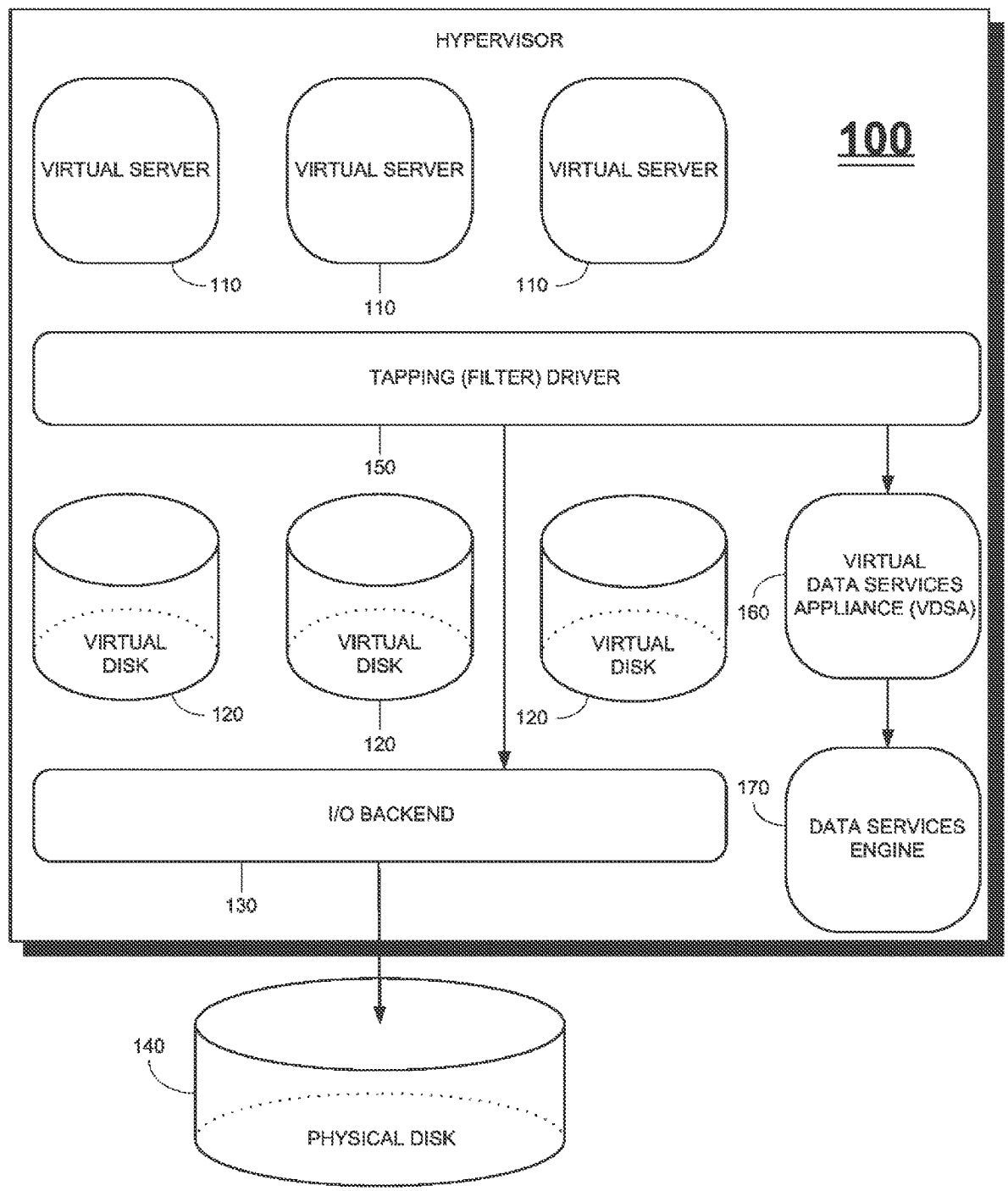
FIG. 1 is a simplified block diagram of a hypervisor architecture that includes a tapping driver and a virtual data services appliance, in accordance with an embodiment of the present invention.

Reference is made to FIG. 1, which is a simplified block diagram of a hypervisor architecture that includes a tapping driver and a VDSA, in accordance with an embodiment of the present invention. Shown in FIG. 1 is a hypervisor 100 with three virtual servers 110, three virtual disks 120, an I/O backend 130 and a physical storage array 140. Hypervisor 100 uses a single physical server, but runs multiple virtual servers 110. Virtual disks 120 are a storage emulation layer that provide storage for virtual servers 110. Virtual disks 120 are implemented by hypervisor 100 via I/O backend 130, which connects to physical disk 140.

Hypervisor 100 also includes a tapping driver 150 installed within the hypervisor kernel. As shown in FIG. 1, tapping driver 150 resides in a software layer between virtual servers 110 and virtual disks 120. As such, tapping driver 150 is able to access I/O requests performed by virtual servers 110 on virtual disks 120. Tapping driver 150 has visibility to I/O requests made by virtual servers 110.

Hypervisor 100 also includes a VDSA 160. In accordance with an embodiment of the present invention, a VDSA 160 runs on a separate virtual server within each physical hypervisor. VDSA 160 is a dedicated virtual server that provides data services via one or more data services engines 170. However, VDSA 160 does not reside in the actual I/O data path between I/O backend 130 and physical disk 140. Instead, VDSA 160 resides in a virtual I/O data path.

Whenever a virtual server 110 performs I/O on a virtual disk 120, tapping driver 150 identifies the I/O requests that the virtual server makes. Tapping driver 150 copies the I/O requests, forwards one copy via the conventional path to I/O backend 130, and forwards another copy to VDSA 160. In turn, VDSA 160 enables the one or more data services engines 170 to provide data services based on these I/O requests.

Figure 2:
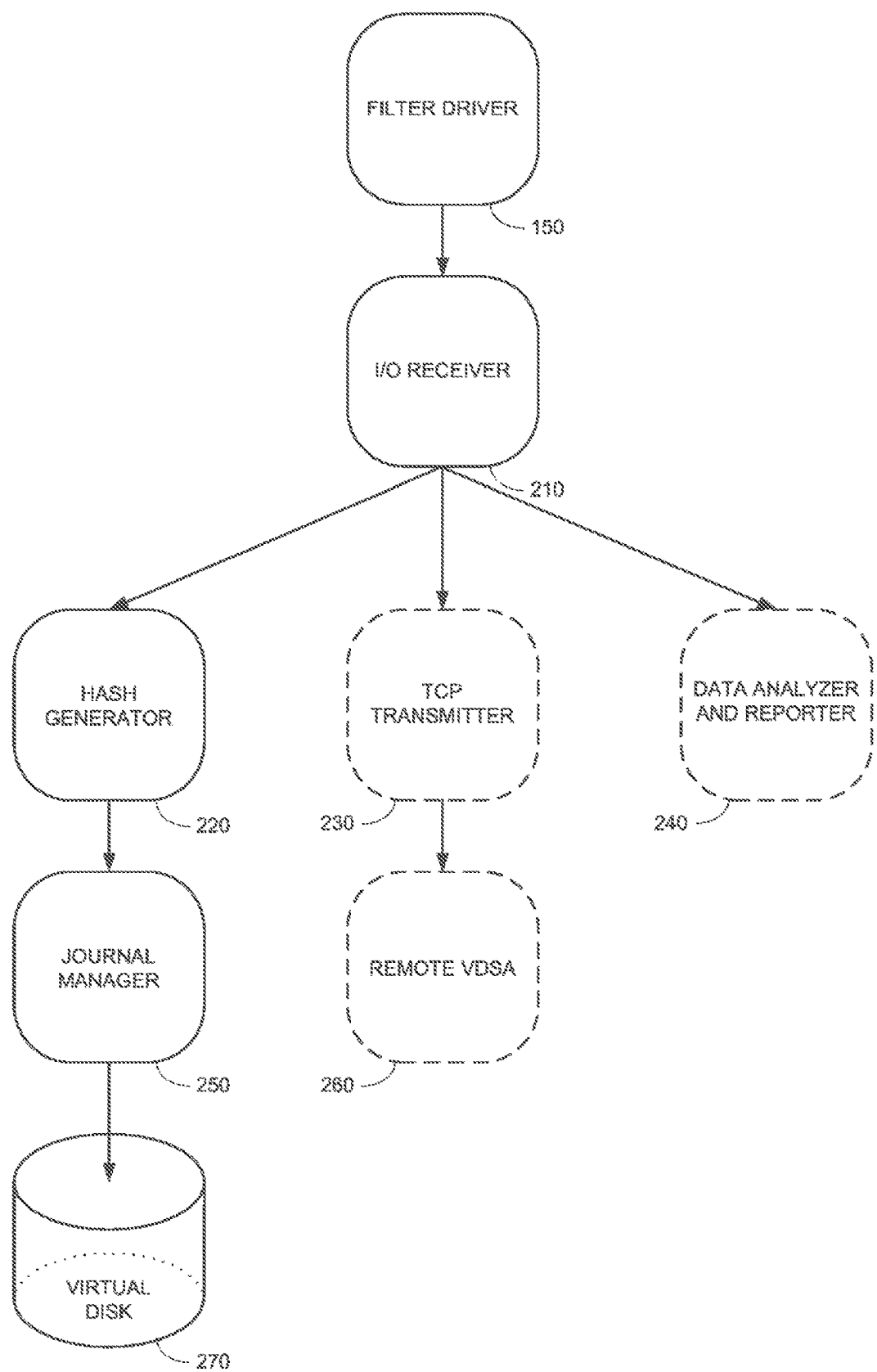
FIG. 2 is a simplified data flow chart for a virtual data services appliance, in accordance with an embodiment of the present invention.

Reference is made to FIG. 2, which is a simplified data flow chart for a VDSA, in accordance with an embodiment of the present invention. Shown in FIG. 2 are an I/O receiver 210, a hash generator 220, a TCP transmitter 230, a data analyzer and reporter 240, a journal manager 250 and a remote VDSA 260. Remote VDSA 260 resides on different physical hardware, at a possibly different location.

As shown in FIG. 2, I/O receiver 210 receives an intercepted I/O request from tapping driver 150. VDSA 160 makes up to three copies of the received I/O requests, in order to perform a set of actions which enable the one or more data services engines 170 to provide various services.

A first copy is stored in persistent storage, and used to provide continuous data protection. Specifically, VDSA 160 sends the first copy to journal manager 250, for storage in a dedicated virtual disk 270. Since all I/O requests are journaled on virtual disk 270, journal manager 250 provides recovery data services for virtual servers 110, such as restoring virtual servers 110 to an historical image. In order to conserve disk space, hash generator 220 derives a one-way hash from the I/O requests. Use of a hash ensures that only a single copy of any I/O request data is stored on disk.

An optional second copy is used for disaster recovery. It is sent via TCP transmitter 230 to remote VDSA 260. As such, access to all data is ensured even when the production hardware is not available, thus enabling disaster recovery data services.

An optional third copy is sent to data analyzer and reporter 240, which generates a report with information about the content of the data. Data analyzer and reporter 240 analyzes data content of the I/O requests and infers information regarding the data state of virtual servers 110. E.g., data analyzer and reporter 240 may infer the operating system level and the status of a virtual server 110.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A hypervisor virtual server system, comprising:
    a plurality of virtual servers;
    a plurality of virtual disks that are read from and written to by said plurality of virtual servers;
    a physical disk;
    an I/O backend coupled with said physical disk and in communication with said plurality of virtual disks, which reads from and writes to said physical disk;
    a tapping driver installed within a hypervisor kernel, in a software layer between at least one of the plurality of virtual servers and at least one of the plurality of virtual disks, the tapping driver in communication with said plurality of virtual servers, wherein the tapping driver intercepts I/O requests made by any one of said plurality of virtual servers to any one of said plurality of virtual disks;
    a virtual data services appliance, in communication with said tapping driver, wherein the virtual data services appliance receives the intercepted I/O requests from the tapping driver, and wherein the virtual data services appliance provides data services including replication, monitoring, and quality of service based thereon; and
    a data analyzer in communication with the virtual data services appliance, wherein the data analyzer determines a data state indicating a state of one virtual server of the plurality of virtual servers that made at least one of the intercepted I/O requests based on content of the intercepted I/O requests.

2. The hypervisor virtual server system of claim 1, further comprising a journal manager in communication with said virtual data services appliance, wherein the journal manager stores the intercepted I/O requests as journal entries in a virtual disk.

3. The hypervisor virtual server system of claim 2, further comprising a hash generator in communication with said virtual data services appliance and with said journal manager, wherein the hash generator generates hash values of the intercepted I/O requests, and wherein said journal manager stores the generated hash values.

4. The hypervisor virtual server system of claim 1, further comprising a TCP transmitter in communication with said virtual data services appliance, wherein the TCP transmitter transmits the intercepted I/O requests to a remote virtual data services appliance.

5. The hypervisor virtual server system of claim 1, wherein the virtual data services appliance is a dedicated virtual server that provides the data services.

6. The hypervisor virtual server system of claim 1, wherein the virtual data services appliance infers an operating system level and status of at least one of the plurality of virtual servers.

7. The hypervisor virtual server system of claim 1, further comprising the tapping driver configured to:
    copy the I/O requests;
    forward a first copy of the I/O requests via the I/O backend; and forward a second copy of the I/O requests to the virtual data services appliance.

8. The hypervisor virtual server system of claim 1, wherein the tapping driver identifies the I/O requests made by an individual virtual server of the plurality of virtual servers, enabling the virtual data services appliance to selectively provide data services based on the I/O requests made by the individual virtual server.

9. A method for providing data services within a hypervisor virtual server system, comprising:
   intercepting, by a tapping driver, I/O requests from at least one of a plurality of virtual servers to at least one of a plurality of virtual disks, the tapping driver installed within a hypervisor kernel in a software layer between the at least one of the plurality of virtual servers and the at least one of the plurality of virtual disks, the tapping driver in communication with the plurality of virtual servers;
   sending, by the tapping driver, the intercepted I/O requests to a virtual data services appliance that provides hypervisor data services including replication, monitoring, and quality of service based thereon; and
   determining, by a data analyzer in communication with the virtual data services appliance, a data state indicating a state of one virtual server of plurality of virtual servers that made at least one of the intercepted I/O requests based on content of the intercepted I/O requests.

10. The method of claim 9 further comprising journaling the intercepted I/O requests.

11. The method of claim 10 further comprising generating hash values for the intercepted I/O requests, and wherein said journaling comprises journaling the generated hash values.

12. The method of claim 9 further comprising analyzing an intercepted I/O request inferring therefrom the data state of the virtual server that made the intercepted I/O request.

13. The method of claim 9 further comprising sending the intercepted I/O requests to a remote computer, thereby providing replication for said plurality of virtual servers.

14. The method of claim 9 wherein the virtual data services appliance is a dedicated virtual server that provides the hypervisor data services.

15. The method of claim 9, further comprising:
   inferring, by the virtual data services appliance, an operating system level and status of at least one of the plurality of virtual servers.

16. The method of claim 9, further comprising:
   copying, by a tapping driver, an I/O request of the I/O requests;
   forwarding, by the tapping driver, a first copy of the I/O request via an I/O backend; and
   forward, by the tapping driver, a second copy of the I/O request to the virtual data services appliance.

17. The method of claim 9, wherein intercepting the I/O requests comprises identifying the I/O requests made by an individual virtual server of the plurality of virtual servers; and
   identifying, by the tapping driver, the I/O requests made by the individual virtual server to enable a virtual data services appliance to selectively provide data services based on the I/O requests made by the individual virtual server.

* * * * *